June 23, 1942.  J. A. MOREHEAD  2,287,191
REFLECTOR
Filed Oct. 18, 1938
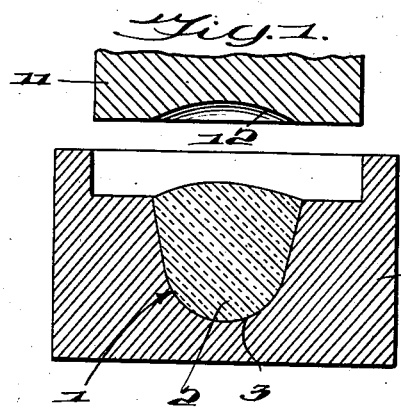
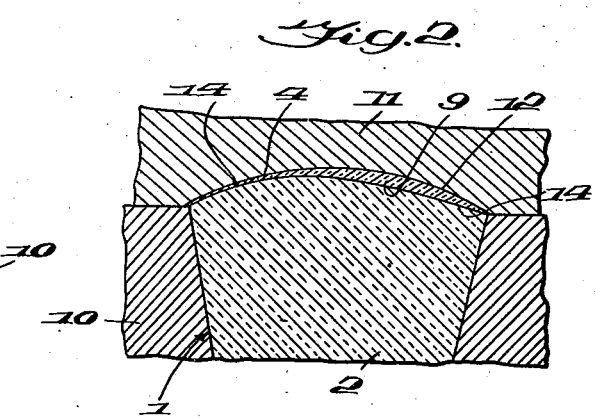
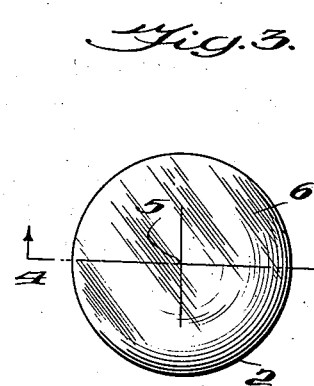
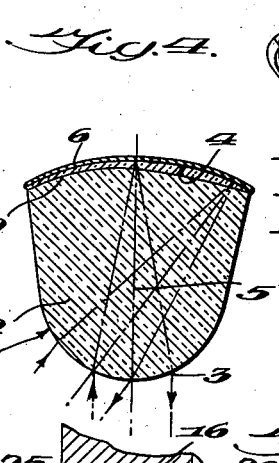
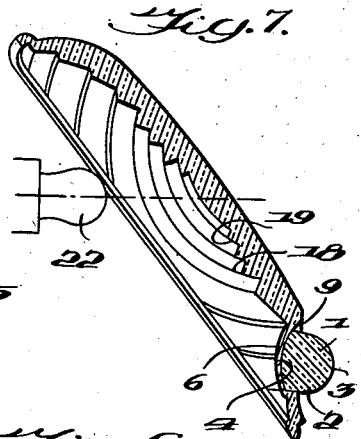
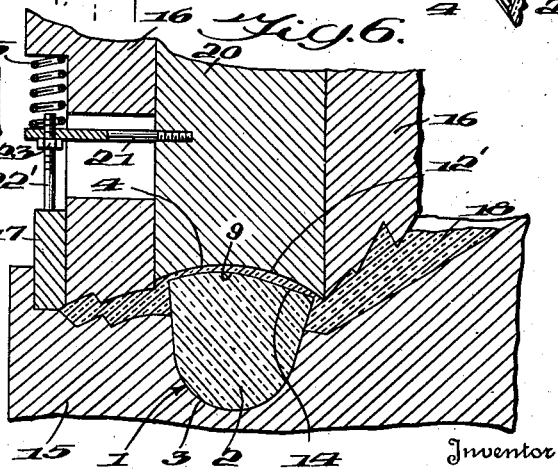
Inventor
JAMES A. MOREHEAD,
By Morris Spector,
Attorney Patented June 23, 1942

2,287,191

UNITED STATES PATENT OFFICE 2,287,191

REFLECTOR

James A. Morehead, Huntington, W. Va., assignor to Samuel M. Dover, Chicago, Ill.

Application October 18, 1938, Serial No. 235,685

6 Claims. (Cl. 88—82)

This application is a continuation in part of my application, Serial No. 67,881, filed March 9, 1936.

This invention relates to optical apparatus and, more particularly, to the portion of the optical apparatus which directs rays of light in the desired manner, namely, to the lens.

The present invention is concerned, more specifically, with autocollimating reflectors such as are used, for instance, on highways, and on automobiles or other vehicles. The object of such reflectors is to reflect light from the headlights of an approaching vehicle back towards the source with an amount of spread only sufficient to enable the reflected light to reach the line of vision of the driver of the approaching vehicle even though the light may strike the reflector from various angles within a wide range. With improved highways and consequent higher and higher automobile speeds it becomes more and more necessary to have such reflectors which are capable of reflecting a large amount of light for very great distances in a direction substantially parallel to the incident beam. The legal requirements in many instances are such that the reflected light from the headlights of an approaching vehicle must be of a specified intensity to be clearly visible at a distance of three hundred feet or more. This necessitates a high degree of precision in the curvature of the reflector thereby, of course, increasing the cost of manufacture of the unit.

Consider, by way of example, an autocollimating reflector of the type shown, for instance, in Figure 3 of the patent to Chretien, Reissue No. 19,070. This comprises essentially a block of glass with convex surfaces at its two ends, the radii of the two surfaces being different and of relative lengths as determined by known optic laws, and the centers of curvature both positioned on the same optical axis. Any deviation in the curvature of the reflecting surface will result in a diminution of the reflected light in the desired direction. At a great distance this diminution is so great as to render the reflector unsatisfactory, even though the deviation from the correct curvature is very very small.

In the manufacture of a comparatively large reflecting button of the type referred to above, such as is necessary where a large amount of reflected light is required, the shrinkage or other distortion of the large mass of molten glass before it solidifies is sufficient to cause such a degree of inaccuracy in the curvature of one or more of the lens surfaces as to render the button useless in most instances, unless it is subjected to grinding or other operations to bring it to the requisite curvature. This defect becomes more and more serious as the size of the reflector button being manufactured is increased. It is one of the objects of the present invention to provide a large reflector button of the above mentioned character, made in two stages, the first stage of which aims to form the reflecting surface, or the surface which becomes distorted, to approximately but not necessarily quite the requisite shape, said surface having less glass than required rather than more glass. Therefore the surface must be built up to the requisite shape instead of having to be ground down to the requisite shape. This unit, when quite hot but still solid, is placed in a mold and a layer of molten glass placed over it. A die then presses the layer of molten glass to the requisite shape so that the newly added glass forms a thin film which is fused to the previously formed reflector button and forms an integral part thereof. Upon retraction of the die, or cooling of the thin film of glass, the total amount of molten glass that is subject to change in shape is so slight that the change in shape of the finished reflecting surface is negligible and the surface cools to substantially the shape to which it has been molded by the die.

Reflector buttons that are to reflect light indicative of danger should be of a red color, since red is the accepted color for indicating danger. Red glass necessarily absorbs a good deal more light than clear transparent glass absorbs, hence a red reflector button is less efficient than is a clear glass reflector button. The efficiency diminishes as the thickness of the button and intensity of the coloring are increased. In large reflector buttons where there is an appreciable thickness of glass this absorption of light within the glass reflector button becomes appreciable. I have discovered a way of making an autocollimating reflector of the above character which will have light absorption characteristics not appreciably different from those of a clear glass reflector and yet will reflect red (or any other desired color). This is accomplished by forming the reflector button of clear glass and then molding a thin film-like layer of colored glass over the back reflecting surface thereof. This thin layer imparts the necessary color to the reflected light and, because of its extreme thinness, absorbs substantially no light. The clear glass reflector button may be molded to a curvature approximately but not quite the requisite shape, the difference requiring a building up of the glass rather than grinding down of the same, and the colored glass may constitute the film which builds up this approximately correctly shaped curve to the correct degree of accuracy of curvature.

The attainment of the above and further objects of the present invention will be apperent from the following specification taken in conjunction with the accompanying drawing forming a part thereof.

In the drawing:

Figure 1 is a diagrammatic sectional view through a mold showing one stage in the process of manufacture of a lens in accordance with the present invention, the mold parts being shown in the open position;

Figure 2 shows, to an enlarged scale, the mold parts of Figure 1 in their closed position;

Figure 3 is a plan view of a lens embodying the present invention;

Figure 4 is a sectional view taken along the line 4—4 of Figure 3;

Figure 5 shows one step in the process of molding a composite lens of which a lens such as shown in Figure 4 is a part, the mold parts being shown in the open position;

Figure 6 is a view similar to Figure 5 and showing the mold parts in their closed position; and Figure 7 is a longitudinal sectional view through an automobile tail lamp lens embodying the present invention.

An explanation will now be given of the present invention as applied to an auto collimating reflector button of the type illustrated, for instance, in Figure 3 of the patent to Chretien, Reissue No. 19,070. The ultimately finished reflector button is indicated by the reference numeral 1 and consists of a body of glass 2 of a generally tubular shape, although it may be somewhat tapered to be of larger diameter at one end than at the other. The body of glass is constructed to reflect light in the form of a beam substantially parallel to the incident beam but having a very slight spread. For this purpose the reflecting button has a front spherical surface 3 and a spherically curved rear surface 4, both surfaces being of different radii of curvature and having their centers on the same optical axis, to-wit: on the optical axis indicated by the center line 5. The rear curved surface is silvered, or covered with reflecting metal 6, so that light striking the reflecting button at the curved surface 3 and passing through the body of glass to the rear surface 6 will be reflected from that surface back towards the surface 3 and thence out of the reflecting button. The shapes of the surfaces 3 and 4 and their distances apart are such as to produce an auto collimating reflector. The requisite shapes for the spherical surfaces 3 and 4 and their distances apart, in order to produce an autocollimating effect, may be determined in a manner known in the art, as disclosed, for instance, in the reissue patent to Chretien above referred to. Light striking the surface 3 follows substantially along the paths indicated by the arrows in Figure 4, and is reflected from the surface 6 and emanates from the curved surface 3 along a path substantially parallel to the incident beam.

In constructing a reflector unit such as has been thus far described it is necessary that the surfaces 3 and 4 be of exactly the requisite curvature. Any slight deviation in the curvature produces a deviation in the parallelism of the incident and reflected light. Only a very slight deviation from the correct curvatures will cause the reflected light to deviate from the incident light an amount such that at a distance of three hundred feet the lens cannot be used for the purposes intended. It is therefore necessary to have a high degree of precision of curvature of the surfaces 3 and 4. When large reflectors of the type thus far described are molded, one of the surfaces 3 or 4 can be molded to exactly the requisite curvature but both surfaces cannot be so molded. This is due to the fact that as the molten glass within the mold cools, and before solidification takes place, there is shrinkage of the glass so that the mass of molten glass does not continue to fill the mold. The molten glass remains in intimate contact with the bottom of the mold, thus assuring a correct curvature for the bottom surface 3, as determined by the mold shape, but it shrinks away from the top of the mold. Once the mass of molten glass has shrunk away from the top of the mold, there is nothing to confine the mass of semi-solid glass to the requisite curvature at the top, and therefore the top surface can be only of approximately the requisite curvature. In such practice it is necessary, after the molding operation, to grind the top curved surface down to the requisite shape. This necessarily greatly increases the cost of production of the lens.

In accordance with the teachings of the present invention the body of glass 2 is made in any desired manner, as by casting. The rear reflecting surface is made so that it is necessary to build it up to the requisite shape rather than to grind it down to the requisite shape. The cast or otherwise formed reflector button, having the desired shape of curvature at the bottom 3, and approximately but not quite exactly the required shape of the top surface, is then placed in a mold, the female part of which is indicated at 10 in Figure 1. While the body of glass 2 is quite hot but in the solid stage, a thin layer or film of molten glass 9 is molded over the top surface of the reflector button. The body of molten glass is dropped onto the reflector button and then a male die 11, having the curvature 12 required for forming the curved surface of the lens, is brought down upon the mass of molten glass which is in contact with the hot preformed body of glass 2, and molds the layer of glass 9 to the requisite shape. In Figure 2 there has been illustrated, on a very much enlarged scale, the male and female dies in their closed position. The thickness of the layer or film of glass 9 has been somewhat exaggerated for illustrative purposes, since actually it may be only of the order of a few thousandths of an inch thick, or as much thicker in places or throughout as is necessary. In Figure 2 there is illustrated the top surface 14 of the precast block 2. The area between the surface 14 and the surface 12 illustrates the extent of deviation of the surface 14 from the requisite surface. Due to the fact that the glass button 2 is preheated, the body of glass at 9 fuses with the body of glass 2 to form one integral mass of glass. As the body of glass 9 cools, and before it solidifies, there will be some shrinkage. However, the amount of this shrinkage is necessarily very small since the total volume of the molten glass 9 is small. Therefore the ultimately cast surface will be of the shape of the curved surface 12 of the male die. This surface requires no further grinding. The surface may then be silvered, as indicated at 6, and the silvered layer may be protected by an outer covering of aluminum or other paint as is known in the art.

This unit may be used as a reflector button in manners known in the art.

In this specification the term "glass" is used in its broadest sense, to include any suitable transparent media.

In many instances it is desired that the reflected light should be of a distinctive color, such as, for instance, red for indicating danger, or other color as desired. If the entire reflector button is made of colored glass there is an appreciable absorption of the white light as it passes through the comparatively thick body of glass. In order to reduce its absorption the main body of glass 2 may be clear glass and the thin layer 9 may be of colored glass to impart the necessary color to the reflected beam. If the reflector button is to be used in an automobile tail lamp the preferred color for the layer 9 is red, the rest of the body 2 being clear glass.

Reference may now be had more particularly to Figures 5 and 6 wherein I illustrate one manner of making an automobile tail lamp lens having an autocollimating reflector button molded in place. In these figures the bottom mold part is indicated at 15, and the plunger or movable part is indicated at 16. A stripper ring 17 fits into the mold 15 and forms a sleeve for the plunger 16. The preformed button of glass 2, which is to constitute the autocollimating reflector, may be made in any desired manner. It may be made of clear glass, and it has a lower curved surface 3 which is of exactly the desired curvature which it is to have in the ultimate lens. The curved surface 14 is approximately but not quite of the desired shape and location required for reflecting light substantially parallel to an incident beam. The button 2 is inserted into a correspondingly shaped cavity in the mold part 15 in the same manner as was previously described in connection with Figure 1, and the ring 17 is then positioned on the mold. The reflector button 2 is at an elevated temperature somewhat less than the maximum temperature permissible without causing such softening of the glass as will result in a flow thereof. The temperature is as low as is practical without causing cracking of the glass in the casting or subsequent cooling. Thereafter a body of red or ruby colored glass in molten form, indicated at 18, is dropped into the mold, and the top or male die member is brought down to mold the tail lamp lens. This male member is of the necessary shape to form the interior surface of the tail lamp lens in the manner required. It includes a slidable plunger 20 having a spherically curved portion 12' which forms the thin layer over the top of the reflector button 2 to bring the curvature and location of the curved portion 14 exactly to the curvature and location required in the autocollimating lens. At the same time a mass of glass is formed around the reflector button 2, which mass of glass and thin layer 9 fuse to the glass 2, thereby forming one integral body of glass. Since the glass 18 is ruby colored the layer 9 imparts the requisite color to the reflected light emanating from the autocollimating body of glass 2. The layer 9 may be of a thickness of the order of 0.175 inch to impart the requisite color to the reflected light, the thickness varying in places depending upon the amount of deviation of the surface 14 from the requisite shape and location.

In Figure 7 I have illustrated a sectional view of a lens made in accordance with the process above described. This lens comprises an autocollimating reflector button 1, of clear glass, with a main body of glass 18 of ruby color. The body of glass 18 may have the usual Fresnel lens rings 19 for directing light from an electric light bulb of the tail light, indicated at 22, in a generally horizontal direction. The rear surface of the reflector button 1 has a silver layer 6 formed thereon, which layer is protected by an outer covering of aluminum or other paint.

In making the automobile tail lamp lens it is possible to use a reflector button, such as is illustrated in Figure 4, with the film of glass 9 already formed in place. However, since the tail lamp lens is to be cast with the reflector button in place the operation for casting the lens may be made to include the operation of forming the thin layer 9 on the reflecting button to bring the surface of the precast or otherwise formed reflector button up to the desired shape and with the surface 4 at exactly the correct distance from the surface 3.

The curved surface 12' constitutes the bottom of a plunger 20 mounted in the male die 16 and slidable therein. A stop 21 is integral with the plunger 20 and slides within an elongated slot in the plunger 16. Adjustable screws 22' are threaded through the stop 21 and locked in place by lock nuts 23. The screws 22' are adjusted in the stop 21 so that when the bottoms of the screws 22' engage the top surface of the stripper ring 17 the bottom surface 12' of the plunger is exactly the requisite distance from the curved surface 3. Thereafter further descent of the male plunger 16 results in no movement of the plunger 20 but permits the male die to descend to press the glass 18 to the requisite shape. Any excess glass in the body of glass 18 will result in a slightly greater thickness of the molded lens but will not affect the distance between the curved surface 12' and the curved surface 3. A number of heavy springs 25 are provided for pressing the plunger 20 towards its lowermost position in the male die so that when the screws 22' abut against the top of the ring 17 and limit further descent of the plunger 20, a further downward movement of the die 16 results in the compression of the powerful springs 25 so that the pressure exerted by the die 16 upon the body of molten glass cannot possibly raise the plunger 20 against the action of the springs 25.

It is to be noted that the rim 27 of the mold extends under the stripper ring 17. As a result, upon upward receding movement of the die 16 the molded lens cannot follow the die. Furthermore, the springs 25 serve to facilitate separating movement of the die 16 from the molded glass body 18.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A light transmitting and reflecting signalling lamp lens having a main body portion adapted to transmit light therethrough from a light source and an insert adapted to reflect light along a path substantially parallel to the incident beam, said body portion and insert being of different kinds of glass, said insert comprising a preformed mass extending into and integrally united at its periphery with the body portion, said body portion having joined thereto a layer of glass overlying the insert and integrally united therewith over a substantial part of its area, the outer surface of said layer and the exposed opposite surface of the insert being of the necessary curvature and spacing to constitute an autocollimating reflector.

2. A light transmitting and reflecting signalling lamp lens having a main body portion adapted to transmit light therethrough from a light source and an insert adapted to reflect light along a path substantially parallel to the incident beam, said body portion and insert being of different kinds of glass, said insert comprising a preformed mass extending into and integrally united at its periphery with the body portion, said body portion having joined thereto a layer of glass overlying the insert and integrally united therewith over a substantial part of its area, the outer surface of said layer and the exposed opposite surface of the insert being of the necessary curvature and spacing to constitute an autocollimating reflector, said insert being of clear glass and said overlying layer being of red glass of substantially less thickness than the clear glass but sufficiently thick to impart a distinctly red color to reflected white light.

3. A signal lamp lens comprising a main body of a danger indicating color and an insert comprising a body of material having different light transmitting characteristics than that of the material of the main body and surrounded by the main body, said two bodies being united along the periphery of the insert to form one integral structure and in addition said first body having joined thereto a layer of the material of which it is made which layer overlies one face of the insert and is united thereto over at least a substantial portion of its area, said insert, together with its overlying layer having surfaces formed to reflect light from a distant source in the general direction of the light source.

4. A light transmitting reflecting signal lamp lens having a portion adapted to transmit light therethrough from a light source and a portion adapted to reflect light along a path substantially parallel to the incident beam, said second portion comprising a preformed body extending into and integrally united at its periphery with the first portion and having a layer of lens material of the first portion overlying the insert and integrally united therewith over at least a substantial part of its area, said lens and insert and overlying layer being of light-pervious glass-like material and said insert being of different color than that of the first portion and said overlying layer on the insert imparting a characteristic color to light reflected from the insert distinctly different from the color of the insert itself.

5. A light transmitting and reflecting signal lamp lens having a portion adapted to transmit light therethrough from a light source and a portion adapted to reflect light along a path substantially parallel to the incident beam, said second portion comprising a preformed body extending into and integrally united at its periphery with the first portion, and said first portion including a layer of lens material overlying the insert and integrally united therewith over at least a substantial part of its area, the first portion being of colored light-pervious glass-like material and the insert being of clear light-pervious glass-like material whereby the overlying layer imparts its color to light reflected by the insert, the front face of the insert and the rear surface of the overlying layer being both curved and of such curvature and spacing from one another to constitute an autocollimating reflector.

6. An automobile signal lamp lens comprising a body of colored light-pervious glass for transmitting light from the interior of the lamp, an insert of clear glass extending into the colored glass but not through the same, whereby said colored glass overlies a surface of the insert which is opposite the exposed surface of the clear glass, the exposed surface of the insert and the opposite outer surface of the colored glass layer being of such relative curvature and spacing as to constitute a reflector lens to reflect incident light along a path substantially parallel to the path of the incident beam but with a slight spread, and a layer of light reflecting material on the surface of the reflector lens which is on the inner side of the lamp lens.

JAMES A. MOREHEAD.